Jan. 19, 1960  D. J. BURKE  2,921,486
TOGGLE CLAMP

Filed July 2, 1956  3 Sheets-Sheet 1

INVENTOR.
DONALD J. BURKE
BY
Oberlin & Limbach
ATTORNEYS.

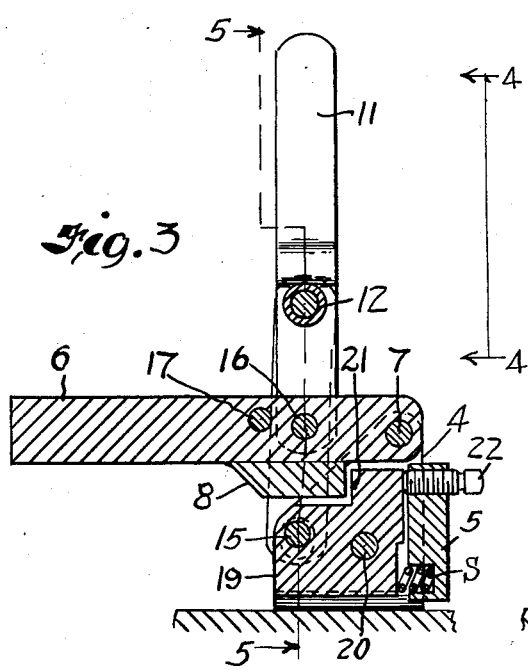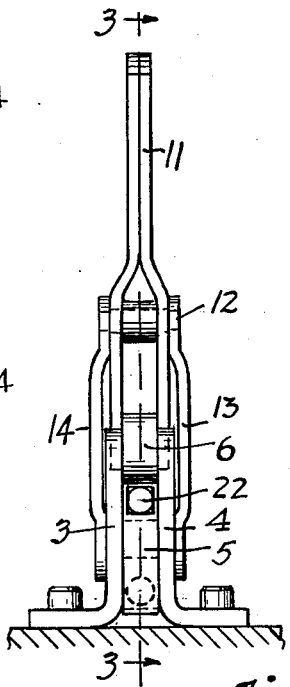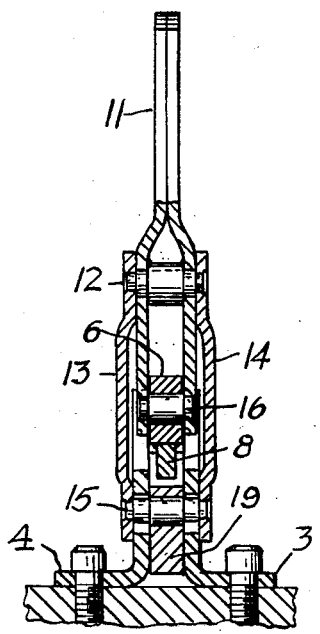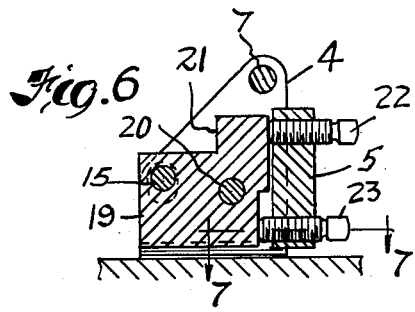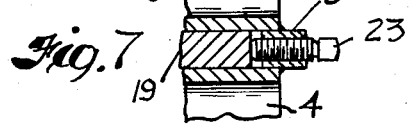

Jan. 19, 1960     D. J. BURKE     2,921,486
TOGGLE CLAMP
Filed July 2, 1956     3 Sheets-Sheet 3
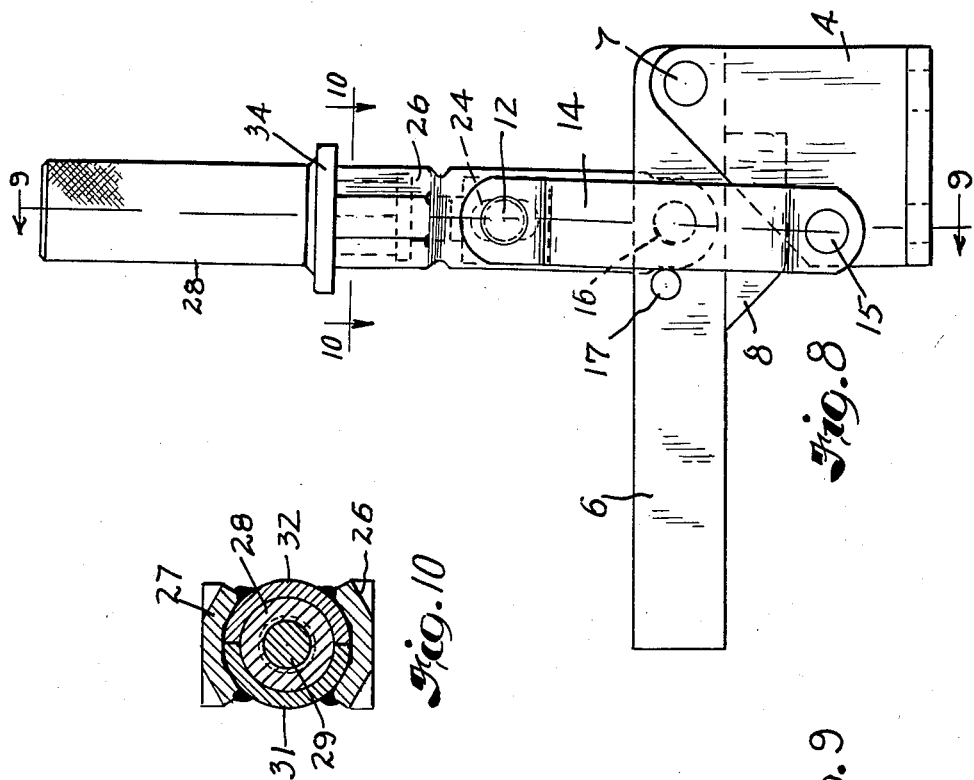
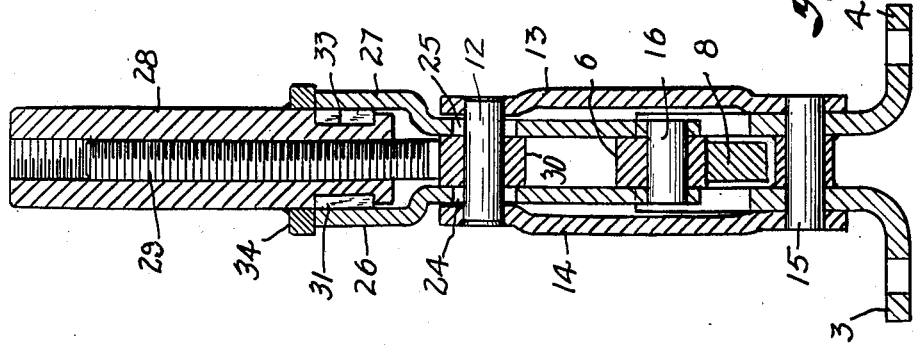
INVENTOR.
DONALD J. BURKE
BY
Oberlin & Limbach
ATTORNEYS.

United States Patent Office 2,921,486
Patented Jan. 19, 1960

2,921,486

TOGGLE CLAMP

Donald J. Burke, East Cleveland, Ohio, assignor to Erico Products, Inc., East Cleveland, Ohio, a corporation of Ohio Application July 2, 1956, Serial No. 595,180

8 Claims. (Cl. 77—62)

This invention relates as indicated to a novel toggle clamp, and more particularly to a work holding clamp especially adapted to secure a work-piece during the performance of an operation thereon such as a drilling operation, for example.

Clamps of the type indicated are very widely employed in machine shops and by the automotive industry. They permit the operator very quickly to locate the work-piece in an appropriate jig or the like and securely to clamp the same for performance of the desired operation thereon. It is, of course, obvious that the work-piece must be held in a very secure manner and ordinarily each work-piece must be positioned exactly as was the preceding one. When the pivots of the toggle clamp become worn sufficiently to afford appreciable play, the pivot pins and bearings must normally be replaced and often it is cheaper merely to discard the toggle clamp and purchase a new one. It has become common practice to provide such clamps with specially hardened bearings in order to prolong the life of the same but this, of course, adds appreciably to the cost of what is fundamentally a relatively simple and inexpensive device.

It is accordingly a principal object of my invention to provide an improved toggle clamp including means for taking up any play which may develop in the pivots after a period of use so that the effective life of the clamp may be greatly extended and a considerable economy accordingly achieved.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 3 is a longitudinal section through the operative elements of my new clamp;

Fig. 4 is a rear end elevational view of my new clamp;

Fig. 5 is a vertical transverse section taken on the line 5—5 on Fig. 3;

Fig. 6 is a fragmentary section similar to Fig. 3 showing a somewhat modified construction;

Fig. 7 is a fragmentary horizontal transverse section taken on the line 7—7 on Fig. 6;

Fig. 8 is a side elevational view of a modified form of toggle clamp embodying the principles of my invention;

Fig. 9 is a vertical section taken on the line 9—9 on Fig. 8; and

Fig. 10 is a transverse section taken on the line 10—10 on Fig. 8.

Figure 1:
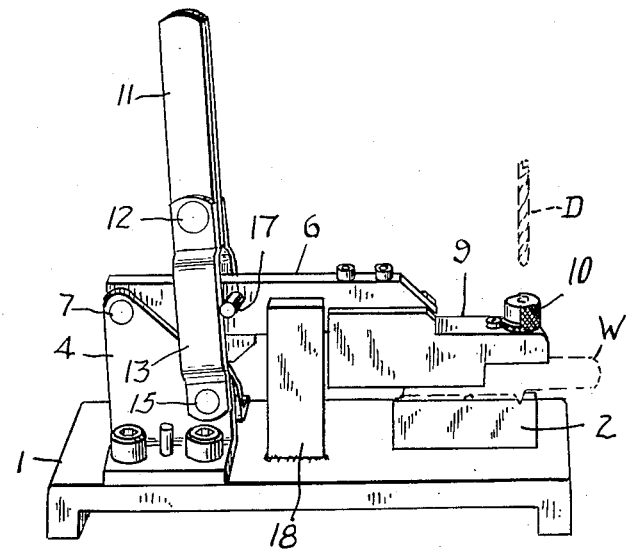
Fig. 1 is a perspective view showing a toggle clamp embodying my invention in work clamping position.
Figure 2:
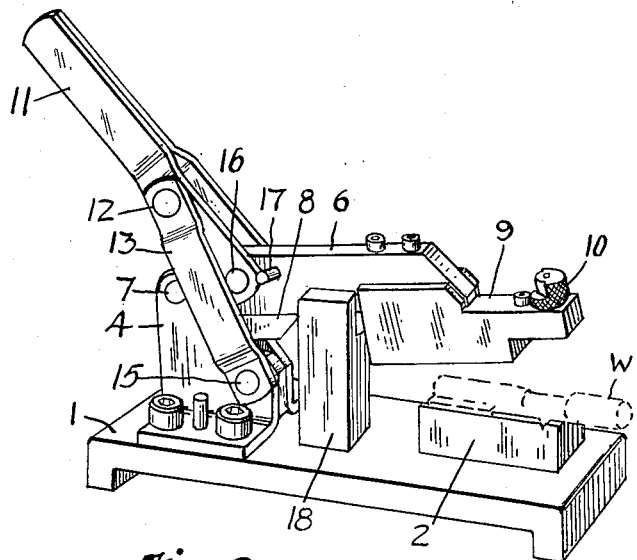
Fig. 2 is a view similar to Fig. 1 but showing the work unclamped.

Referring now more particularly to said drawing, the embodiment of my invention there illustrated comprises a base 1 carrying a work supporting fixture 2 on which the work W is adapted to be supported in position to be clamped for the performance of an operation thereon. Rigidly mounted on such base 1 is a stand comprising two laterally spaced angle plates 3 and 4 joined together by a spacer back block 5 to which they are welded. The lower horizontal flanges of members 3 and 4 are adapted to be bolted to base 1 or to any other appropriate bench or base as may be desired.

A clamping bar 6 is pivotally mounted at 7 between the upper ends of side plates 3 and 4 and is provided with a downwardly projecting rigidifying gusset 8. An extension 9 may be removably secured to the end of bar 6 carrying appropriate guide means 10, for example, for a drill D when in work clamping position (Fig. 1). It is obvious that a variety of different types of clamping jaws may be thus mounted on bar 6.

A handle 11 is pivotally mounted at 12 between two links 13 and 14, the lower ends of which are themselves pivotally mounted at 15 on upstanding plates 3 and 4. Handle 11 is bifurcated and extends downwardly below pivot 12, being pivotally connected at 16 to bar 6, thereby affording the basic toggle arrangement well known in the art.

A transversely projecting pin 17 may be inserted in clamping bar 6 which will engage the front edges of links 13 and 14 when the handle 11 is brought into vertical position as shown in Figs. 1, 3, 4 and 5, bar 6 being locked in this position against upward swinging movement due to the vertically aligned relationship of the toggle pivots 12, 15 and 16. A block 18 may also be provided if desired on base 1 to limit downward movement of clamping bar 6.

Interposed between upstanding side plate members 3 and 4 is a block 19 pivotally secured therebetween by horizontal transverse pivot pin 20. A vertical step 21 in its upper edge provides clearance for gusset 8 on bar 6. Pivot pin 15 passes through slots in upstanding side members 3 and 4 as well as fitting in block 19 so that a substantial degree of pivotal movement of block 19 about pivot 20 may be permitted (see Figs. 3, 5 and 6). A compression spring S may be interposed between the lower end of spacer block 5 and block 19, tending to rock the latter in a clockwise direction about its pivot 20 as viewed in Fig. 3, a set screw 22 serving to limit such movement. By turning screw 22, block 19 may be rocked in a counterclockwise direction as viewed in Fig. 3 to take up play in pivots 12, 16 and 15 when handle 11 and its associated pivots are in vertical toggle locking position, despite wear which may have taken place in the pivots.

In the modification illustrated in Figs. 6 and 7, a lower screw 23 in spacer block 5 is substituted for compression spring S, screws 22 and 23 being simultaneously adjusted to turn block 19 as desired.

It will be seen from the foregoing that I have provided a novel form of toggle clamp which is inexpensive of construction but which will nevertheless have as long a useful life as one provided specially hardened pivot bearings. The device requires no special skill for proper adjustment and precise and accurate clamping of the work may accordingly be ensured over a long useful life.

Referring now more particularly to the modified form of toggle clamp shown in Figs. 8–10 inclusive of the drawing, embodying the principles of my invention, such toggle clamp is of basically similar construction and those elements directly corresponding to the previously described form are accordingly similarly numbered. Instead of utilizing the tilting block 19, however, different means is provided for taking up any play which may develop.

Instead of providing slotted openings in base members 3 and 4 for pivot pin 15, I provide such vertically slotted openings 24 and 25 in the downwardly extending fork portions 26 and 27 of the handle. The upper portion of such handle comprises a knurled generally cylindrical end portion 28 threaded interiorly to engage a screw 29 joined to pivot block 30 in which pivot 12 fits. The upper ends of handle fork members 26 and 27 are swaged as best shown in Figs. 8 and 10 and are welded to two half rings 31 and 32 fitting in annular groove 33 in the inner end portion of cylindrical handle member 28. A ring or sleeve 34 is welded to handle member 28 adapted to bear against the outer ends of handle fork portions 26 and 27.

It will now be apparent that knurled handle 28 may be rotated to draw up on screw 29 and accordingly pivot lock 30, thereby taking up any play in pivots 15 and 16. This device is not only effective to take up wear in the three pivots 12, 16 and 15 which are aligned when bar 6 is in work clamping position, but handle 28 may also be adjusted properly to clamp articles which may be of slightly varying thickness. This feature is of particular advantage when clamping castings, for example, for the performance of like operations thereon, but which castings often vary slightly in dimensions.

Other modes of applying the principle of the invention may be employed, change being made as regards the details described, provided the features stated in any of the following claims or the equivalent of such be employed.

I therefore particularly point out and distinctly claim as my invention:

1. In a toggle clamp comprising a plurality of members pivotally connected for movement into in-line toggle locking position; means operative adjustably to shift an endmost pivot of such in-line assembly in such in-line direction comprising a handle member mounted for rotation about such in-line axis, and screw means threadedly engaging said handle member for axial shifting upon rotation of said handle member, said screw means engaging a said adjacent endmost pivot for shifting therewith.

2. In a work holding toggle clamp having a stand portion, a clamping member pivotally mounted on said stand, a link pivotally connected to said stand, and an operating handle pivotally connected to said clamping member at a point spaced from the pivotal mounting of said clamping member on said stand and also pivotally connected to said link intermediate the pivotal connection of said handle with said clamping member and the operating end of said handle to move said clamping member against the work, all said pivots being parallel to each other and said pivotal connections of said link with said stand, said link with said handle, and said handle with said clamping member being adapted to lie on the same line to afford a toggle action when said handle is brought into parallelism with said link; the pivot of said connection between said handle and link closely fitting in said link but with play in said handle longitudinally thereof, and means on said handle adjustable to move said latter pivot and thereby said link along the line through said pivots in work clamping position.

3. The clamp of claim 2, wherein said tension applying means comprises a screw member engaging said latter pivot, and an axially rotatable outer handle portion threadedly engaging said screw means operative when turned to shift the same.

4. The clamp of claim 2 wherein said tension applying means comprises a screw member engaging said latter pivot, and an axially rotatable outer handle portion threadedly engaging said screw means operative when turned to shift the same, said handle and clamping member being movable together relative to said latter pivot, whereby the toggle-locked position of said clamping member may be regulated to accommodate work-pieces of somewhat different size.

5. In a work holding toggle clamp having a stand portion, a clamping member pivotally mounted on said stand, a link pivotally connected to said stand, and an operating handle pivotally connected to said clamping member at a point spaced from the pivotal mounting of said clamping member on said stand and also pivotally connected to said link intermediate the pivotal connection of said handle with said clamping member and the operating end of said handle, all the pivots being parallel to each other and the pivotal connections of said link with said stand, said link with said handle, and said handle with said clamping member being adapted to lie on the same line to afford a toggle action when said handle is brought into parallelism with said link; a mounting member supported in said stand for up-and-down rocking movement about an eccentric axis parallel to said pivots, the pivot connecting said link to said stand being mounted in said mounting member for movement about said eccentric axis and substantially along said line through said pivotal connections in a direction away from the pivot connecting said link to said handle, and adjusting means operable thus to rock said mounting member and to shift said pivot connecting said link to said stand substantially along said line to take up and play.

6. The clamp of claim 5 wherein said adjusting means is a screw threadedly engaged in said stand and bearing against said mounting member to rock the same.

7. In a toggle clamp comprising a plurality of pivotally interconnected toggle members having three pivots adapted to be moved into in-line toggle locking positions; a base, a support member pivotally mounted on said base for rocking movement about a fixed pivot parallel to the axes of such pivots and carrying an end-most pivot of such in-line pivot assembly, and separate means operable to rock said support member on said base to vary the position of said end-most pivot relative to said base, said toggle clamp including a work clamping member pivotally mounted on said base and operatively pivotally connected to said interconnected toggle members.

8. The clamp of claim 7 wherein said separate means includes an adjsuting screw bearing against said support member operative adjustably to move said support member about said fixed pivot.

References Cited in the file of this patent

UNITED STATES PATENTS

| | | |
|---|---|---|
| 2,312,947 | Westman | Mar. 2, 1943 |
| 2,408,586 | Spievak | Oct. 1, 1946 |
| 2,443,153 | Wells | June 8, 1948 |